United States Patent
Knight et al.

(10) Patent No.: US 11,056,910 B1
(45) Date of Patent: Jul. 6, 2021

(54) ENGINE TRANSMISSION-DEPENDENT CONTROL FOR ELECTRIC AUXILIARY POWER GENERATION

(71) Applicant: Parker-Hannifin Corporation, Cleveland, OH (US)

(72) Inventors: Steven Knight, Avon, CT (US); Ken Wittamore, Fowey (GB); Nigel Calder, Newcastle, ME (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 16/771,370

(22) PCT Filed: Sep. 12, 2018

(86) PCT No.: PCT/US2018/050544
§ 371 (c)(1),
(2) Date: Jun. 10, 2020

(87) PCT Pub. No.: WO2019/125541
PCT Pub. Date: Jun. 27, 2019

Related U.S. Application Data

(60) Provisional application No. 62/646,469, filed on Mar. 22, 2018, provisional application No. 62/607,338, filed on Dec. 19, 2017.

(51) Int. Cl.
*H02J 9/08* (2006.01)
*B60K 25/02* (2006.01)
*H02J 7/14* (2006.01)

(52) U.S. Cl.
CPC ............... *H02J 9/08* (2013.01); *B60K 25/02* (2013.01); *H02J 7/14* (2013.01); *B60K 2025/022* (2013.01); *H02J 2310/42* (2020.01)

(58) Field of Classification Search
CPC . H02J 9/08; H02J 7/14; H02J 2310/42; B60K 25/02; B60K 2025/022
See application file for complete search history.

(56) References Cited

U.S. PATENT DOCUMENTS

| | | | |
|---|---|---|---|
| 9,193,273 B1 | 11/2015 | Frank et al. | |
| 9,586,665 B2 | 3/2017 | Aschaber | |
| 2006/0052215 A1* | 3/2006 | Beaty | B60K 6/48 477/5 |
| 2009/0284228 A1 | 11/2009 | Kumar | |
| 2012/0207620 A1 | 8/2012 | Dalum et al. | |
| 2015/0336522 A1 | 11/2015 | Cook et al. | |

FOREIGN PATENT DOCUMENTS

WO    2014/089394    6/2014

OTHER PUBLICATIONS

International Search Report and Written Opinion for corresponding International Patent Application No. PCT/US2018/050544 dated Oct. 31, 2018.

\* cited by examiner

*Primary Examiner* — Carlos Amaya
(74) *Attorney, Agent, or Firm* — Renner, Otto, Boisselle & Sklar, LLP

(57) ABSTRACT

An auxiliary electric power device, which is coupled to a prime mover, provides electric power to convenience outlets, appliances, and heating cooling units. Based on a mode of a transmission coupled to the prime mover, one of a plurality of control schemes is selected to control the power provided by the auxiliary electric power device.

20 Claims, 5 Drawing Sheets

ENGINE TRANSMISSION-DEPENDENT CONTROL FOR ELECTRIC AUXILIARY POWER GENERATION

RELATED APPLICATIONS

This application is a national phase of International Application No. PCT/US2018/050544 filed Sep. 12, 2018 and published in the English language, which claims benefit to U.S. Provisional Application No. 62/646,469 filed on Mar. 22, 2018, and to U.S. Provisional No. 62/607,338 filed on Dec. 19, 2017, the contents of which are incorporated here by reference.

TECHNICAL FIELD

The present disclosure relates generally to electrical power generation. More specifically, the present disclosure relates to a method and apparatus for optimizing electric power generation of an on-engine electric power generator.

BACKGROUND INFORMATION

In most conventional marine power systems, an engine, such as a diesel or gasoline engine, provides power to propel the marine vessel in the water. The prime mover also drives an alternator for providing limited electric power to operate the engine, any accessories of the engine and other low power 12V item on the vessel such as lighting, radios etc. For convenience power, such as 120 volt power, a separate electric power generation system is typically provided. The separate electric power generation system can include an additional prime mover, such as a small diesel, gasoline, or other type of internal combustion engine, and an electric machine, such as an alternator or generator. The electric power generation system, for example, can be run independent of the main "propulsion" engine, thereby providing power when needed, even when the marine vessel is anchored and/or not moving under its own power.

A drawback to such separate electric power generation systems is that they must be operating in order to provide electric power. Further, these systems are typically sized for a peak loads (e.g., 10 kWatt) due to high/momentary inrush currents of motor driven appliances such as air conditioning. Many times, however, the full rated power of the electric power generation system is not needed and thus a system configured for large power production is run even when demand is low, resulting in inefficiencies. Further, due to the large size of the system excessive noise and/or fuel consumption occurs, particularly in low power demand situations.

SUMMARY OF THE INVENTION

A system, device and method in accordance with the present invention utilize an on-engine generator (OEG) to provide power to convenience outlets and convenience accessories (e.g., air conditioning, refrigerator, microwave, etc.) of a vehicle, such as a marine vessel, work trucks, ambulances or any vehicle that has ancillary equipment. The OEG, which is an electric machine such as an alternator or generator, may be in addition to the electric power generation system for operating the engine itself. For example, the marine vessel may include an engine-driven first alternator for powering the engine components and engine accessories, and an engine driven second alternator or generator for powering convenience outlets (via an inverter) and other high power accessories of the vessel. Excess power from the OEG can be stored in a storage device for use at a later time, thereby providing electric power without the need to operate the prime mover.

A large OEG can consume significant torque from the engine and can compromise its ability to drive the primary load (i.e., the propulsion system). To address this possibility, use of the OEG can be optimized such that maximum power is available to the propulsion system when needed. In this regard, one of a plurality of different power control schemes for controlling the OEG may be selected based on a state of a transmission coupled to the engine. For example, a position of a transmission gear selector (e.g., forward, neutral, reverse) or other means can be analyzed and, based on the analysis, a control scheme for the OEG is selected that is optimized for the state of the transmission (and thus the state of the vessel).

Transmission Position Detection (TPD) allows two completely different control schemes for controlling the power output of the OEG to co-exist. One of the control schemes can be optimized for power generation when the transmission is in neutral and one of the power control schemes can be optimized when the transmission is in gear (e.g., in optimize fuel consumption and prioritize power to the propulsion system).

According to one aspect of the invention, a method for controlling an auxiliary electric power source operative to provide supplemental power is provided, wherein the auxiliary electric power source is coupled to a prime mover, and wherein the prime mover is coupled to a transmission having a plurality of operating modes. The method includes: detecting an operating mode of the transmission; selecting a control algorithm for controlling power output by the auxiliary electric power source, said selection based on the detected operating mode of the transmission; and regulating the power output by the auxiliary electric power source based on the selected control algorithm.

Optionally, the transmission includes a gear selector for selecting the operating mode of the transmission, and detecting the operating mode of the transmission includes detecting a position of the gear selector.

Optionally, selecting comprises selecting one of a first control algorithm operative to maximize electric power generated by the auxiliary electric power source or a second control algorithm operative to maximize fuel economy of the prime mover.

Optionally, the second control algorithm prioritizes providing mechanical power from the prime mover to the transmission over generation of electric power by the auxiliary electric power source.

Optionally, detecting the operating mode comprises detecting an operating mode corresponding to one of neutral or in-gear.

Optionally, selecting comprises selecting the first control algorithm upon detecting the transmission is in neutral and selecting the second control algorithm upon detecting the transmission is in-gear.

Optionally, the method includes storing excess electrical power from the auxiliary electric power source in an electric storage device.

According to another aspect of the invention, a controller for regulating power generated by an auxiliary electric power source operative to provide convenience power is provided, wherein the auxiliary electric power source is coupled to a prime mover that has a primary electric power source for providing power to operate the prime mover, and wherein the prime mover is coupled to a transmission having a plurality of operating modes. The controller includes: a processor and memory operatively coupled to the processor; logic stored in the memory and executable by the processor, the logic including: detection logic configured to detect an operating mode of the transmission; selection logic configured to select a control algorithm for controlling power output by the auxiliary electric power source, said selection based on the detected operating mode of the transmission; and regulation logic configured to regulate power output by the auxiliary electric power source based on the selected control algorithm.

Optionally, the transmission includes a gear selector for selecting an operating mode of the transmission, and the logic configured to detect the operating mode of the transmission includes logic configured to detect a position of the gear selector.

Optionally, the logic configured to select comprises logic configured to select one of a first control algorithm operative to maximize electric power generated by the auxiliary electric power source or a second control algorithm operative to maximize fuel economy of the prime mover.

Optionally, the second control algorithm is configured to prioritize providing mechanical power from the prime mover to the transmission over generation of electric power by the auxiliary electric power source.

Optionally, the logic configured to detect comprises logic configured to detect a mode of the transmission corresponding to one of neutral or an in-gear.

Optionally, the logic configured to select comprises logic configured to select the first control algorithm upon detecting the transmission mode is neutral and selecting the second control algorithm upon detecting the transmission mode in-gear.

Optionally, the controller includes logic configured to store excess electrical power from the auxiliary electric power source in an electric storage device.

According to another aspect of the invention, a power system for a vehicle includes: a prime mover; an auxiliary electric power source coupled to the prime mover, the auxiliary electric power source operative to generate electric power; a transmission having an input and an output, the input coupled to the prime mover, the transmission having a plurality of modes; and the controller as described herein operatively coupled to the transmission and the auxiliary power source.

Optionally, the transmission includes a gear selector for selecting one of an in-gear mode operative to couple the input to the output, and a neutral mode operative to decouple the input from the output.

Optionally, the system includes an electrical storage device electrically connected to the auxiliary power source.

Optionally, the electrical storage device comprise a battery.

Optionally, the system includes a propulsion system coupled to the output of the transmission.

Optionally, the prime mover comprises a primary electric power source.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

Many aspects of the invention in accordance with the present disclosure can be better understood with reference to the following drawings. The components in the drawings are not necessarily to scale, emphasis instead being placed upon clearly illustrating the principles in accordance with the present disclosure. Likewise, elements and features depicted in one drawing may be combined with elements and features depicted in additional drawings. Additionally, in the drawings, like reference numerals designate corresponding parts throughout the several views.

DETAILED DESCRIPTION

Figure 1:
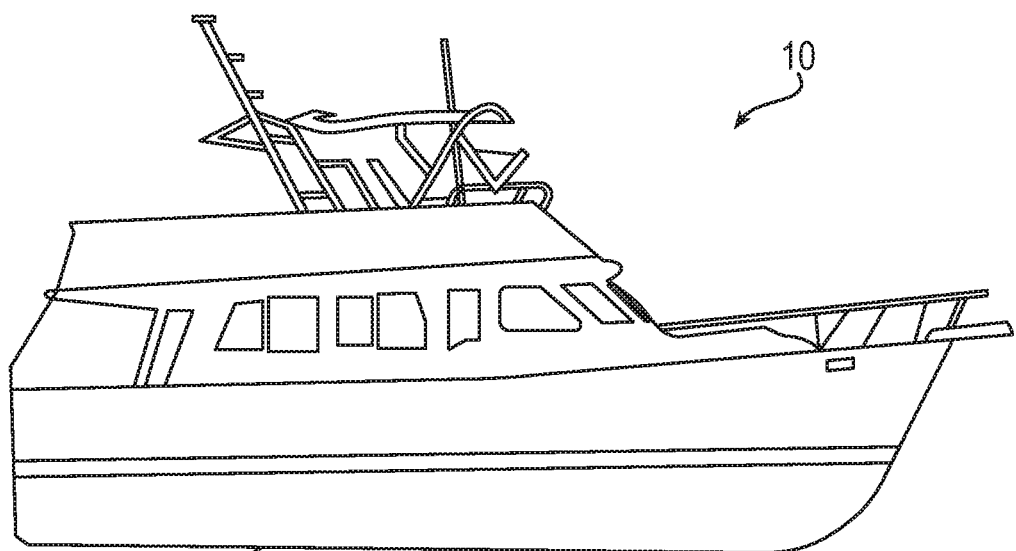
FIG. 1 is a block diagram of a marine vessel that includes a power system having an OEG in accordance with the invention.

The application is described in the context of an auxiliary power generation device utilized on a marine vessel. It will be appreciated, however, that aspects of the invention have utility on any vehicle that includes ancillary equipment, including work trucks, ambulances, recreational vehicles, etc. As used herein, ancillary equipment is defined as any onboard equipment that is above and beyond what's strictly necessary for the vessel/vehicles mobility.

A method, system and apparatus in accordance with the present invention provide a means for delivering electric power to a marine vessel in an efficient and convenient manner. In accordance with the invention, a prime mover, such as a diesel engine or the like, includes, in addition to a primary electric power generation device, an auxiliary electrical power generation device (AEPGD—also referred to as an on-engine generator or OEG) for providing electric power to operate appliances, convenience outlets, etc. of the marine vessel. While in the preferred embodiment the AEPGD is illustrated as being in addition to a primary electric power generation device, it will be appreciated that the primary and auxiliary electric power generation devices could be implemented as a single device.

In the exemplary embodiment, the AEPGD may be an 8 kW nominal high efficiency 48V DC generator that can charge large battery banks primarily feeding AC inverters for house loads. It will be appreciated, however, that the power rating and voltage may be selected based on the application requirements. The AEPGD may be rigidly mounted to the prime mover via brackets or the like and be driven by the prime mover via a belt system. While the AEPGD is illustrated as being driven by a belt system, it will be appreciated that other mounting and driving means for the AEPGD may be employed without departing from the scope of the invention. A controller for controlling the power output by the AEPGD selects one of a plurality of different control algorithms based on a position of a gear selector of a transmission coupled to the prime mover.

For example, when the transmission is detected to be in neutral a first control algorithm is used to regulate the power output by the AEPGD. The first control algorithm may be configured to maximize the generation and storage of electrical power and/or to optimize efficiency in a stand-alone generation mode. When the transmission is detected to be in gear (e.g., forward or reverse) a second control algorithm is used to regulate power output by the AEPGD. The second control algorithm may be configured to optimize fuel economy of the prime mover, to prioritize power delivery to the propulsion system of the marine vessel, and/or to operate in compliance with emission standards.

In addition to optimizing fuel economy and/or efficiency (in comparison to the conversion of fuel into useful propulsion and electrical power), the system, device and method in accordance with the present invention enables the prime mover, while the transmission is in neutral, to be shut down automatically when any alarm conditions are detected, protecting the engine, and without interrupting power delivery. Further, the engine can be shutdown automatically when charging is complete, thereby allowing the system to be safely left unattended. Also, since the prime mover need not be operating at all times, noise associated with the electric power generation can be reduced.

The system, device and method in accordance with the present invention can provide equal or greater utility and lifestyle benefits relative to a traditional diesel-generator installation. In particular, extended silent power mode, overnight air conditioning, safety (no fumes/odor), and more efficient energy generation are provided. Further, such benefits can be provided with reduced size, weight, installation requirements, and maintenance.

Referring to FIG. 1, illustrated is a marine vessel 10, such as a boat, yacht, or the like. The marine vessel 10 includes a marine power system 12 for propelling the marine vessel 10 through the water and for providing convenience power on the marine vessel. The power system 12 may include a prime mover, such as a diesel or gasoline engine, a transmission having an input coupled to the prime mover, a propeller, and a propeller shaft coupling the propeller to an output of the transmission. Based on a mode of the transmission (e.g., in-gear forward, in-gear reverse, or neutral), mechanical power from the prime mover is selectively coupled to the propeller shaft thus effecting motion of the marine vessel 10. The power system 12 also includes an electrical power generation system for providing electric power to operate the marine vessel and for providing convenience power to passengers on the vessel.

Figure 2:
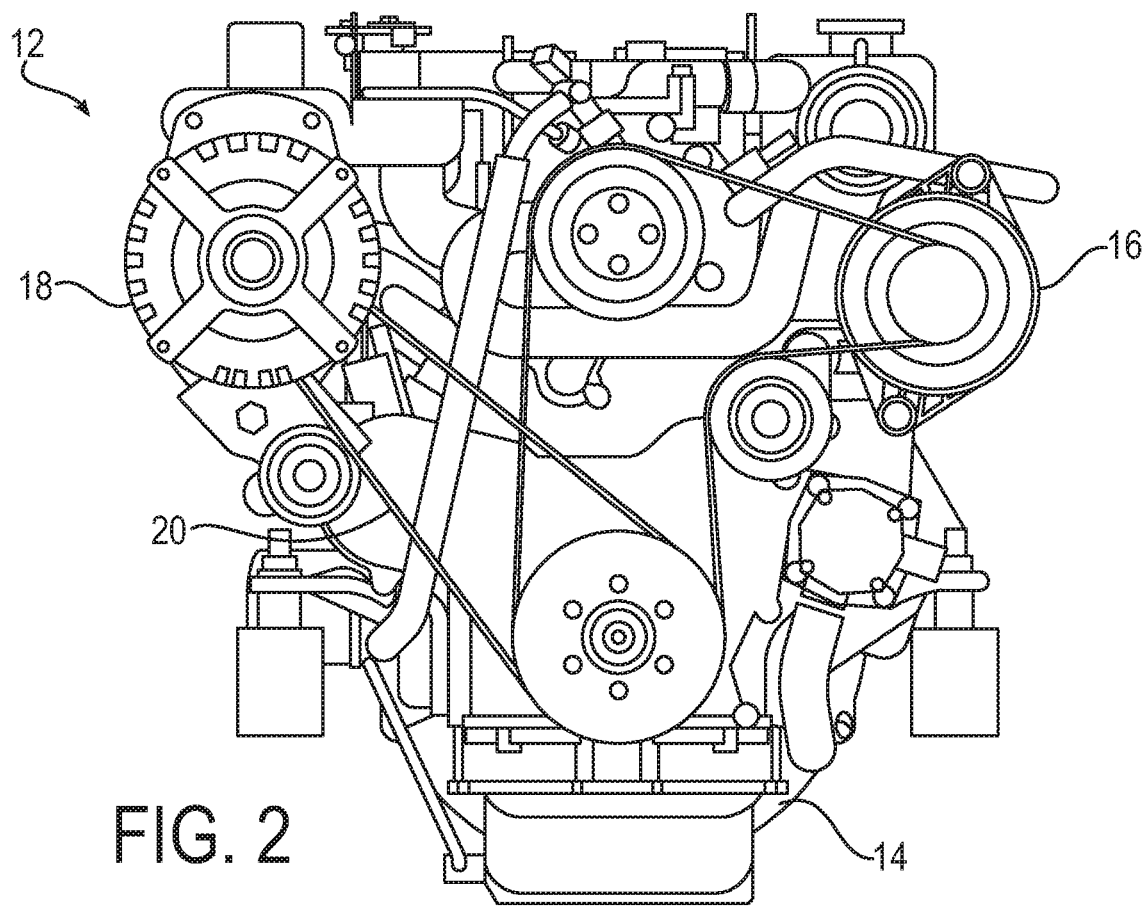
FIG. 2 is a schematic diagram illustrating an exemplary prime mover having a primary electric power generation system and an OEG in accordance with the present invention.

Referring to FIG. 2, illustrated is a portion of the power system 12 of a marine vessel in accordance with the present invention. More particularly, illustrated is a prime mover 14, such as a diesel engine or the like, a primary electric power generation device 16 (PEPGD), such as an alternator, that is operative to provide electric power to support systems of the prime mover 14 (e.g., spark generation, fuel injectors, controllers, DC loads, etc.) and an AEPGD 18 for providing convenience power (e.g., electric power for outlets, heating/cooling, appliances, lights, etc.). The PEPGD 16 and the AEPGD 18 are both driven by the prime mover 14 via a belt-drive system 20.

Figure 3:
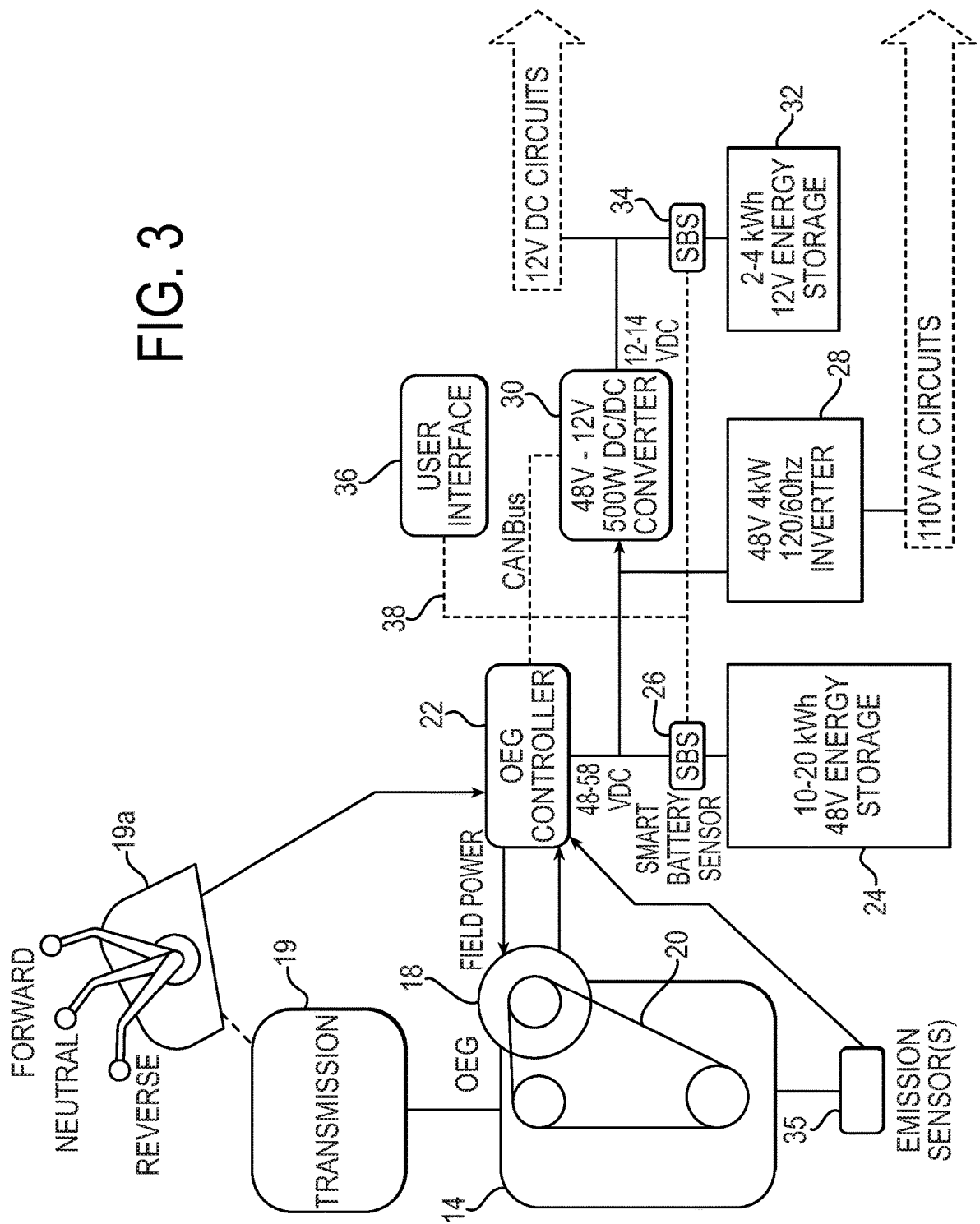
FIG. 3 is a block diagram illustrating a new installation of an exemplary OEG power system in accordance with the invention.
Figure 4:
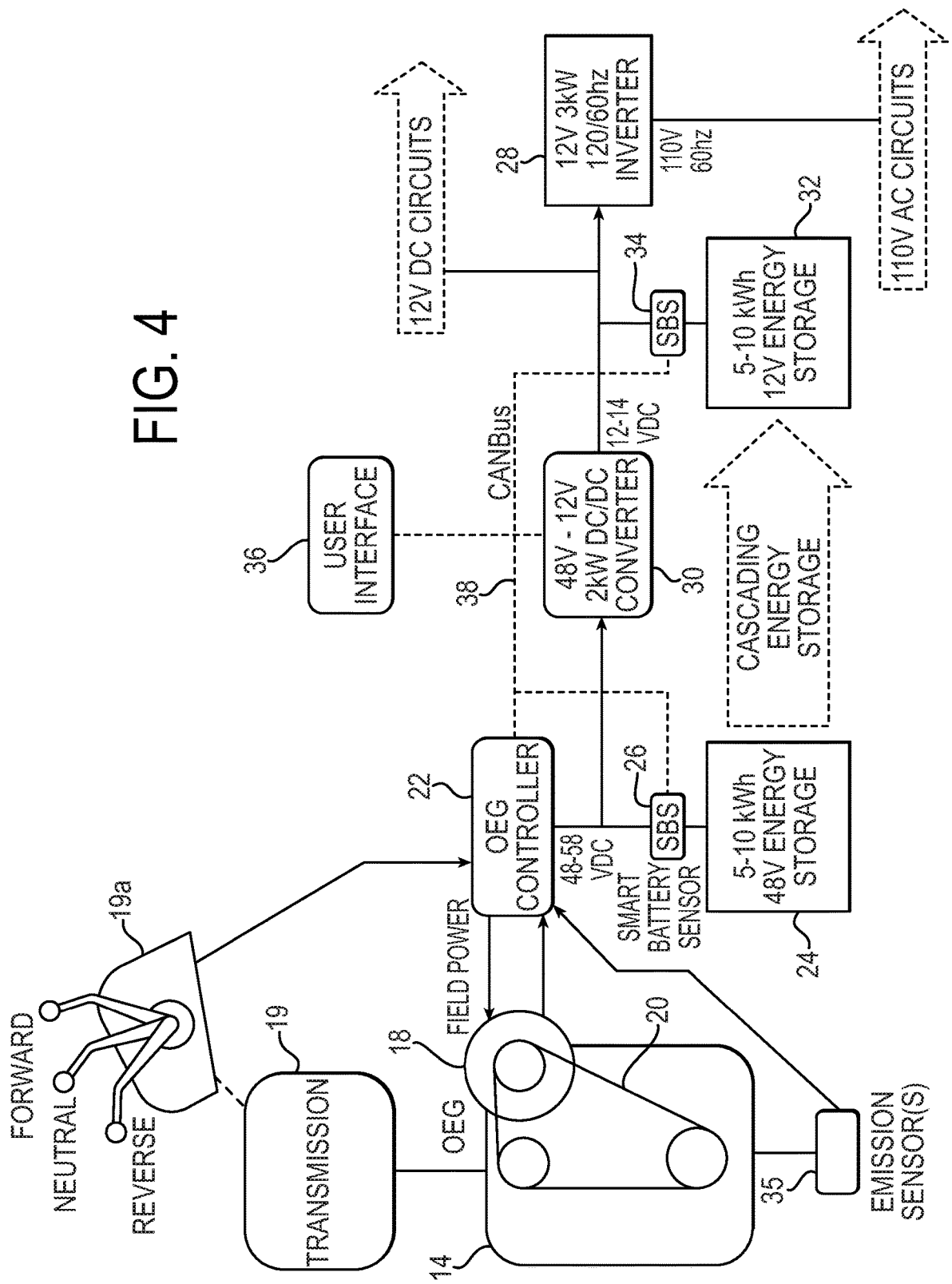
FIG. 4 is a block diagram illustrating a retrofit installation of an exemplary OEG power system in accordance with the invention.

With additional reference to FIGS. 3 and 4, illustrated are block diagrams of exemplary marine vessel power systems 12 in accordance with the present invention. FIG. 3 illustrates an exemplary marine vessel power system installed in a new marine vessel. A new vessel install favors a heavily biased 48 VDC energy storage system, where all large loads are connected to 48 VDC power. FIG. 4 illustrates an exemplary marine vessel power system retrofitted to a marine vessel that previously had a conventional power system. A retrofit install favors a balanced 48 VDC/12 VDC energy storage system, where large loads are powered from 12 VDC converted to 48 VDC As shown in FIG. 3, a prime mover 14 is mechanically coupled to a transmission 19, the transmission 19 having a gear selector 19a for selecting an operating mode of the transmission (e.g., forward, neutral, reverse). The output of the transmission is mechanically coupled to a propeller (not shown) via a propeller shaft (not shown) (or, depending on the application, to some other drive train). The prime mover 14 also drives an AEPGD 18 (e.g., a DC generator or the like) via a drive mechanism such as, for example, belt drive 20. A controller 22 regulates power generated by the 18. For example, the AEPGD may be embodied as a DC generator, and the controller 22 may vary the power provided to a field coil of the DC generator, thereby controlling the electric power output of the AEPGD 18. While a DC generator is illustrated, the AEPGD may be embodied as a different electric device, such as a permanent magnet electric machine. In such embodiment the controller may be a three-phase power controller, for example. Electric power output by the AEPGD 18, which in the illustrated embodiment is 48 volts DC, is electrically connected to an energy storage device 24 (e.g., a battery bank) via a charge controller 26. The charge controller 26 (e.g., a voltage/current sensor) may monitor the charge stored by the storage device 24 and selectively provide electric power to the storage device 24.

An A/C inverter 28 and a DC/DC converter 30 are also electrically connected to the AEPGD output. The inverter 28 converts the 48 VDC power to 115 VAC power (or other AC voltage) for use by convenience outlets on the marine vessel. Such convenience outlets may be used to power electrical and electronic devices, such as televisions, coffee makers, blenders, battery chargers, or any other electrical/electronic device. The DC/DC converter 30 converts the 48 VDC power to 12 VDC (or other DC voltage as needed by the specific application) for use by 12 volt circuits of the marine vessel 10. A second energy storage device 32 stores the converted 12 VDC (or other DC voltage) via a second charge controller 34, thereby providing a 12 VDC source when the prime mover is off.

The system can be controlled and/or monitored via a user interface 36, such as an LCD display or the like. The field controller 22, charge controllers 26 and 34, converter 30 and user interface 36 can be communicatively coupled to each other via a communication network 38 (e.g. a CAN bus or the like).

The system of FIG. 4 is similar to the system of FIG. 3, but due to the retrofit nature of the system of FIG. 4 the size and arrangement of various components may be different. As shown in FIG. 4, a prime mover 14 is mechanically coupled to a transmission 19, the transmission 19 having a gear selector 19a for selecting an operating mode of the transmission (e.g., forward, neutral, reverse). The prime mover 14 also drives an AEPGD 18 via a belt drive 20. A controller 22 regulates power generated by the AEPGD 18 as described above with respect to FIG. 3. Electric power output by the AEPGD 18 is electrically connected to an energy storage device 24 (e.g., a battery bank) via a charge controller 26. A DC/DC converter 30 is also electrically connected to the AEPGD output, the DC/DC converter 30 being rated higher than the converter illustrated in FIG. 3. The DC/DC converter 30 converts the 48 VDC power to 12 VDC for use by 12 volt circuits of the marine vessel 10. Further, a second energy storage device 32 stores the converted 12 VDC via a second charge controller 34. An AC inverter 28 is connected to the output of the DC/DC converter 30, the AC inverter 28 operative to convert the 12 VDC power to 115 VAC power for use by convenience outlets on the marine vessel.

The system can be controlled and/or monitored via a user interface 36, such as an LCD display or the like. The field controller 22, charge controllers 26 and 34, converter 30 and user interface 36 can be communicatively coupled to each other via a communication network 38 (e.g. a CAN bus or the like).

Accordingly, the system of FIG. 4 is similar to the system of FIG. 3, except that the size and/or connection location of some devices are different from the corresponding devices in FIG. 3.

Figure 5:
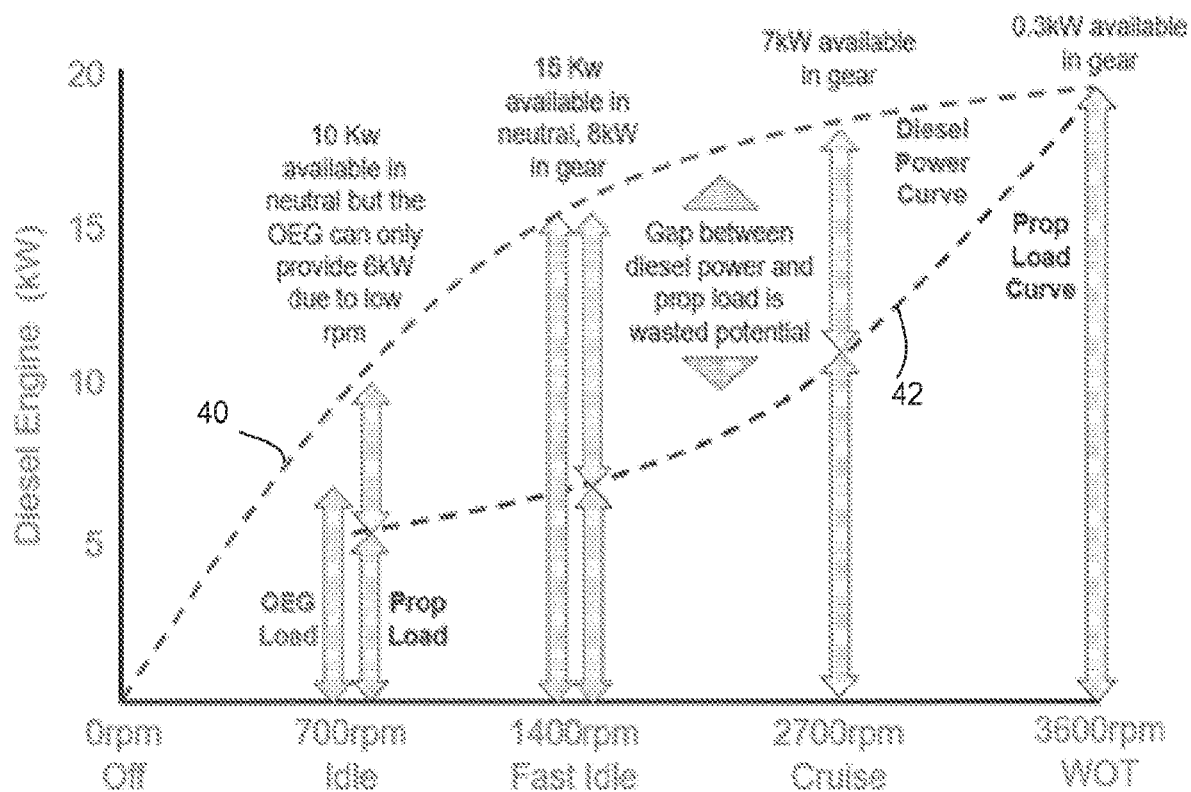
FIG. 5 is a graph showing the available torque from a prime mover and the load from a propeller over various operating speeds.

Referring now to FIG. 5, illustrated is a graph showing the available power 40 from an exemplary prime mover 14 in the form of a diesel engine over an operating range of the diesel engine. Also shown is the propeller load 42 over the same operating range. As can be seen, other than at wide-open throttle a power "gap" exits throughout the operating range, where the available power from the diesel engine exceeds the load from the propeller. This excess power can be used during cruise operation of the marine vessel to generate electric power for devices on the marine vessel and/or to charge the storage devices 24 and 32. Moreover, and as discussed in more detail below, in the event full power is required by the propeller electric power generation can be reduced and/or disengaged in order to divert maximum power from the prime mover 14 to the propeller.

Figure 6:
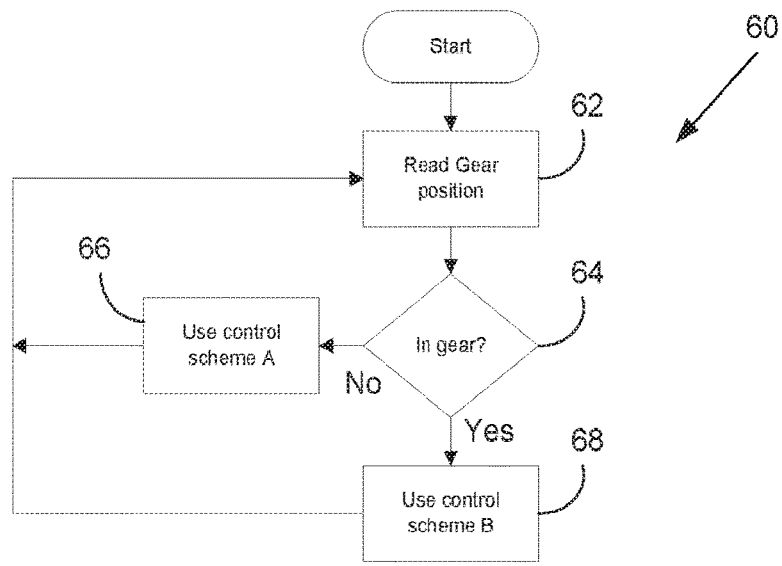
FIG. 6 is a flow chart illustrating an exemplary method for selecting a control scheme for the OEG in accordance with the invention.
Figure 7:
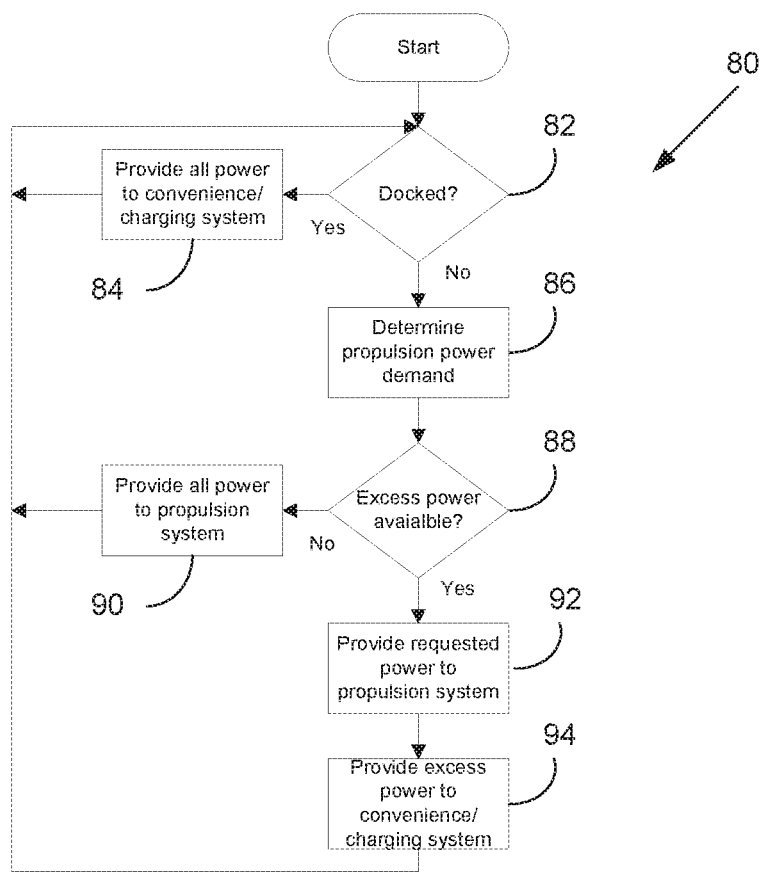
FIG. 7 is a flow chart illustrating another exemplary method for selecting a control scheme for the OEG in accordance with the invention.

Referring now to FIGS. 6 and 7, illustrated are exemplary methods for controlling the AEPGD 18 in accordance with the present invention. FIG. 6 illustrates a method for selecting a control algorithm for regulating electric power produced by the AEPGD 18 based on a gear selector 19a of the transmission 19, and FIG. 7 describes operation of the respective algorithms. The methods may be executed, for example, by the controller 22 (see FIGS. 3 and 4) of the AEPGD 18, the controller 22 including a processor and memory or other circuitry configured to carry out the steps of the method. The memory or other circuitry may include a power generation module configured to execute the method described herein. Alternatively, the controller 22 may be embodied in an application specific integrated circuit or the like.

Referring to the method 60 of FIG. 6, beginning at step 62 detection logic of the controller 22 detects an operation mode of the transmission. In the present embodiment, the operation mode of the transmission 19 is determined based on a position of a gear selector 19a. It will be appreciated, however, that other methods may be employed for detecting an operating mode of the transmission without departing from the scope of the invention. For example, operating modes of the transmission may be determined based on rotation of an input shaft relative to an output shaft, determining engagement or disengagement of gears, direct communications with a control module of the transmission 19, etc.

Continuing with step 62, the position of the gear shift selector may be read by the controller 22 via an input device of the controller (e.g., a digital input) or read via the network 38. For a marine vessel, the operating modes typically include neutral, in-gear forward, and in-gear reverse. It will be appreciated, however, that other modes are possible without departing from the scope of the invention, e.g., torque control.

At step 64 selection logic selects a control algorithm for controlling power output by the AEPGD 18, where the selection is based on the detected operating mode of the transmission 19. For example, it can be determined, based on the position of the gear selector 19a as read at step 62, whether or not the transmission is in gear or in neutral. If the gear shift selector 19a is in neutral the method moves to step 66 and uses a first control algorithm. The first control algorithm may be optimized for maximum battery charging in neutral at fast idle, e.g., it is configured to maximize electric power generated by the AEPGD 18 and to maximize energy stored in the energy storage devices 24, 32). Upon completion of step 66, the method moves back to step 62 and repeats.

Moving back to step 64, if it is determined that the transmission is in gear, then the method moves to step 68 and uses a second control algorithm. The second control algorithm is configured to maximize fuel economy of the prime mover 14. Further, the second control algorithm is configured to prioritize providing mechanical power from the prime mover 14 to the transmission 19 (and thus the propeller) over generation of electric power by the AEPGD 18. For example, if the operator of the marine vessel 10 commands full power to the propeller, then the second control algorithm will minimize or inhibit the generation of electric power from the AEPGD 18. In this manner, less load is placed on the prime mover 14 and thus more power is available for propulsion of the marine vessel 10. Upon completion of step 68, the method moves back to step 62 and repeats.

Accordingly, the system senses when the propeller is engaged and effectively de-rates the AEPGD 18 to the available torque, thereby maximizing fuel efficiency.

Moving now to FIG. 7, illustrated is an alternative embodiment of a method 80 for controlling the auxiliary electric power generator 18 in accordance with the present invention. Beginning at step 82, it is determined if the marine vessel is docked/anchored or otherwise not moving under power. As noted above, the gear selector 19a can be used to determine the operating mode of the transmission and from this information the status of the marine vessel 10 can be inferred (e.g., it can be inferred that the marine vessel is docked/anchored/not moving under power when the transmission is in neutral). If it is determined that the marine vessel 10 is docked/anchored or otherwise not moving under power, then the method moves to step 84 and the controller 22 controls the AEPGD 18 to provide maximum electric power for charging the storage device, for use by appliances and for heating/cooling of the vessel 10. In this regard, the controller 22 can control the field voltage to the DC generator (or other mechanism) and/or can vary the speed of the prime mover 14 in order to maximize the power generated by the AEPGD 18. Preferably, the controller 22 is limited in how much it can vary the speed of the prime mover (e.g., 20% above idle speed). The method then moves back to step 82 and repeats.

Moving back to step 82, if it is determined that the marine vessel 10 is not docked/anchored or is moving under power, then the method moves to step 86 where the load created by the propulsion system is determined. As seen in FIG. 5, the load created by the propeller varies with rotational speed of the propeller, and increases in a non-linear manner as speed increases. The controller 22 can estimate the load created by the propeller based on a speed of the prime mover. For example, a lookup table or the like can be stored in memory of the controller 22, the lookup table including prime mover speed entries and a corresponding propeller load entries along an operating range of the prime mover 14. The controller 22 then can determine the load from the propeller simply by accessing the lookup table based on the known prime mover speed.

Next at step 88 the controller 22 determines if there is excess power available from the prime mover 14. For example, the controller 22 may know the maximum power that can be provided by the prime mover 14 (e.g., via a factory preset value stored in memory) and can compare the known maximum available power with the expected load from the propeller. If the power available from the prime mover 12 does not exceed the load expected from the propeller, then the method moves to step 90 and all power from the prime mover 14 is provided to the propeller. More specifically, since generation of electric power by the AEPGD 18 places a load on the prime mover 14, the controller 22 can command the AEPGD 18 to cease producing electric power (or produce electric power at some minimum level), thereby placing less load on the prime mover 14. Since less load is placed on the prime mover 14, more power is available for delivery to the propeller. This is particularly important in situations where maximum power is requested by a driver of the marine vessel, e.g., to avoid an object.

Moving back to step 88, if the known maximum available power of the prime mover 14 exceeds the expected load from the propeller, the method moves to step 92 where power is provided to the propeller. Then at step 94 the controller 22 commands the AEPGD 18 to produce electric power for use on the marine vessel and/or for charging the storage devices, while ensuring that the propeller load is satisfied. The method then moves back to step 82 and repeats.

Power/torque provided to the AEPGD 18 can be software limited at any point if deemed necessary. When installed on a marine vessel, software will de-rate the AEPGD 18 on the fly while in gear, balancing against propulsion loads/available power, to follow in a region between a preferred full load curve and a load (e.g., propeller) curve. In this manner, efficiency of the prime mover 14 is optimized and electric power is provided to the marine vessel.

Although the principles, embodiments and operation of the present invention have been described in detail herein, this is not to be construed as being limited to the particular illustrative forms disclosed. For example, the illustrated mechanical gear set could alternatively include a planetary mechanical gear set. Also, the illustrated hybrid mechanism could alternatively include electric motors and generators and batteries and the operation of the vehicle body power equipment could be assisted by stored electrical energy. It will thus become apparent to those skilled in the art that various modifications of the embodiments herein can be made without departing from the spirit or scope of the invention.

The invention claimed is:

1. A method for controlling power distribution for a vehicle, the vehicle including a primary electric power source for powering a prime mover and an auxiliary electric power source operative to provide supplemental power to the prime mover and to power one or more ancillary equipment devices other than the prime mover, wherein the auxiliary electric power source is coupled to the prime mover, and wherein the prime mover is coupled to a transmission having a plurality of operating modes, the method comprising:
   detecting an operating mode of the transmission;
   selecting a control algorithm for controlling power output by the auxiliary electric power source for distributing power between the prime mover and the one or more ancillary equipment devices, said selection based on the detected operating mode of the transmission; and
   regulating the power output by the auxiliary electric power source between the prime mover and the one or more ancillary equipment devices based on the selected control algorithm.

2. The method according to claim 1, wherein the transmission includes a gear selector for selecting the operating mode of the transmission, and detecting the operating mode of the transmission includes detecting a position of the gear selector.

3. The method according to claim 1, wherein selecting comprises selecting one of a first control algorithm operative to maximize electric power generated by the auxiliary electric power source or a second control algorithm operative to maximize fuel economy of the prime mover.

4. The method according to claim 3, wherein the second control algorithm prioritizes providing mechanical power from the prime mover to the transmission over generation of electric power by the auxiliary electric power source.

5. The method according to claim 1, wherein detecting the operating mode comprises detecting an operating mode corresponding to one of neutral or in-gear.

6. The method according to claim 1, wherein selecting comprises selecting the first control algorithm upon detecting the transmission is in neutral and selecting the second control algorithm upon detecting the transmission is in-gear.

7. The method according to claim 1, further comprising storing excess electrical power from the auxiliary electric power source in an electric storage device.

8. A controller for regulating power distribution for a vehicle, the vehicle including a primary electric power source for powering a prime mover and an auxiliary electric power source operative to provide supplemental power to the prime mover and to power one or more ancillary equipment devices other than the prime mover, wherein the auxiliary electric power source is coupled to the prime mover, and wherein the prime mover is coupled to a transmission having a plurality of operating modes, the controller comprising:
   a processor and memory operatively coupled to the processor;
   logic stored in the memory and executable by the processor, the logic comprising:
      detection logic configured to detect an operating mode of the transmission;
      selection logic configured to select a control algorithm for controlling power output by the auxiliary electric power source for distributing power between the prime mover and the one or more ancillary equipment devices, said selection based on the detected operating mode of the transmission; and regulation logic configured to regulate power output by the auxiliary electric power source between the prime mover and the one or more ancillary equipment devices based on the selected control algorithm.

9. The controller according to claim 8, wherein the transmission includes a gear selector for selecting an operating mode of the transmission, and the logic configured to detect the operating mode of the transmission includes logic configured to detect a position of the gear selector.

10. The controller according to claim 8, wherein the logic configured to select comprises logic configured to select one of a first control algorithm operative to maximize electric power generated by the auxiliary electric power source or a second control algorithm operative to maximize fuel economy of the prime mover.

11. The controller according to claim 8, wherein the second control algorithm is configured to prioritize providing mechanical power from the prime mover to the transmission over generation of electric power by the auxiliary electric power source.

12. The controller according to claim 8, wherein the logic configured to detect comprises logic configured to detect a mode of the transmission corresponding to one of neutral or an in-gear.

13. The controller according to claim 12, wherein the logic configured to select comprises logic configured to select the first control algorithm upon detecting the transmission mode is neutral and selecting the second control algorithm upon detecting the transmission mode in-gear.

14. The controller according to claim 8, further comprising logic configured to store excess electrical power from the auxiliary electric power source in an electric storage device.

15. A power system for a vehicle, comprising:
a prime mover;
an auxiliary electric power source coupled to the prime mover, the auxiliary electric power source operative to generate electric power;
a transmission having an input and an output, the input coupled to the prime mover, the transmission having a plurality of modes; and
the controller according to claim 8 operatively coupled to the transmission and the auxiliary power source.

16. The power system according to claim 15, wherein the transmission includes a gear selector for selecting one of an in-gear mode operative to couple the input to the output, and a neutral mode operative to decouple the input from the output.

17. The power system according to claim 15, further comprising an electrical storage device electrically connected to the auxiliary power source.

18. The power system according to claim 15, wherein the electrical storage device comprises a battery.

19. The power system according to claim 15, further comprising a propulsion system coupled to the output of the transmission.

20. The power system according to claim 15, wherein the prime mover comprises a primary electric power source.

* * * * *